United States Patent
Hutchison

(10) Patent No.: US 11,154,946 B2
(45) Date of Patent: Oct. 26, 2021

(54) SYSTEMS AND METHODS FOR THE CONTROL OF WELDING PARAMETERS

(71) Applicant: ILLINOIS TOOL WORKS INC., Glenview, IL (US)

(72) Inventor: Richard Martin Hutchison, Iola, WI (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 478 days.

(21) Appl. No.: 14/319,637

(22) Filed: Jun. 30, 2014

(65) Prior Publication Data

US 2015/0375326 A1 Dec. 31, 2015

(51) Int. Cl.
| | |
|---|---|
| B23K 9/095 | (2006.01) |
| B23K 9/02 | (2006.01) |
| B23K 9/12 | (2006.01) |
| B23K 9/16 | (2006.01) |
| B23K 9/10 | (2006.01) |
| B23K 9/173 | (2006.01) |

(52) U.S. Cl.
CPC .......... *B23K 9/0956* (2013.01); *B23K 9/1056* (2013.01); *B23K 9/125* (2013.01); *B23K 9/173* (2013.01)

(58) Field of Classification Search
None
See application file for complete search history.

(56) References Cited

U.S. PATENT DOCUMENTS

| | | | |
|---|---|---|---|
| 2,365,958 | A | 12/1944 | Holslag |
| 2,416,047 | A | 2/1947 | Dolan |
| 3,236,997 | A | 2/1966 | Johnson |
| 3,288,982 | A | 11/1966 | Haruyoshi |

(Continued)

FOREIGN PATENT DOCUMENTS

| | | |
|---|---|---|
| CA | 2072711 | 12/1992 |
| CN | 2181354 | 11/1994 |

(Continued)

OTHER PUBLICATIONS

Robert G. Brown, Robert A. Sharpe, William L. Hughes, Robert E. Post, Lines, Waves, and Antennas The Transmission of Electric Energy, 1961, John Wiley & Sons Inc, ISBN 0-471-06677-X.*

(Continued)

*Primary Examiner* — Ibrahime A Abraham
*Assistant Examiner* — Gyounghyun Bae
(74) *Attorney, Agent, or Firm* — McAndrews, Held & Malloy, Ltd.

(57) ABSTRACT

A welding system includes a welding torch, a power supply, one or more sensors, and a controller is provided. The welding torch advances an electrode toward a workpiece in a first direction. The power supply provides a flow of electricity to the electrode for generating a welding arc between the electrode and the workpiece. Generating the welding arc generates a weld puddle behind the welding arc as the electrode moves in the first direction. The sensor generates a voltage output signal based on the amount of light received from the weld puddle. The controller is communicatively coupled with the sensor to receive the voltage output signal, and the sensor controls a welding parameter of the welding system based the voltage output signal.

20 Claims, 4 Drawing Sheets

(56) References Cited

U.S. PATENT DOCUMENTS

| | | | | |
|---|---|---|---|---|
| 3,370,151 A * | 2/1968 | Normando | ............ | B23K 9/127 |
| | | | | 219/124.34 |
| 3,659,071 A * | 4/1972 | Henderson | ............ | B23K 9/013 |
| | | | | 219/124.02 |
| 3,725,629 A | 4/1973 | Vickers | | |
| 3,766,355 A * | 10/1973 | Kottkamp | ............ | B23K 15/02 |
| | | | | 219/121.12 |
| 3,809,853 A | 5/1974 | Manz | | |
| 3,819,373 A * | 6/1974 | Sable | ............ | G03B 27/73 |
| | | | | 430/30 |
| 3,849,786 A * | 11/1974 | Nanba | ............ | G03B 7/083 |
| | | | | 396/251 |
| 3,849,871 A | 11/1974 | Kaunitz | | |
| 3,858,025 A * | 12/1974 | Sidbeck | ............ | B23K 9/0256 |
| | | | | 219/124.34 |
| 3,946,349 A | 3/1976 | Haldeman | | |
| 4,083,255 A * | 4/1978 | McKechnie | ............ | G01H 9/00 |
| | | | | 250/573 |
| 4,093,844 A * | 6/1978 | Fellure | ............ | B23K 9/0735 |
| | | | | 219/124.02 |
| 4,151,395 A * | 4/1979 | Kushner | ............ | B23K 9/30 |
| | | | | 219/124.34 |
| 4,160,967 A | 7/1979 | Beech | | |
| 4,188,419 A | 2/1980 | Detert | | |
| 4,222,023 A | 9/1980 | Beech | | |
| 4,348,578 A * | 9/1982 | Masaki | ............ | B23K 9/0956 |
| | | | | 219/130.01 |
| 4,426,565 A | 1/1984 | Rueter | | |
| 4,446,354 A | 5/1984 | Kearney | | |
| 4,447,703 A | 5/1984 | Stol | | |
| 4,454,408 A * | 6/1984 | Kajiwara | ............ | B23K 9/0956 |
| | | | | 219/124.34 |
| 4,477,712 A * | 10/1984 | Lillquist | ............ | B23Q 35/128 |
| | | | | 219/124.34 |
| 4,484,059 A * | 11/1984 | Lillquist | ............ | B23K 9/0956 |
| | | | | 219/124.34 |
| 4,493,971 A | 1/1985 | Nawa | | |
| 4,531,040 A | 7/1985 | Nawa | | |
| 4,532,404 A * | 7/1985 | Boillot | ............ | B23K 9/0956 |
| | | | | 219/124.34 |
| 4,536,634 A | 8/1985 | Nawa | | |
| 4,546,234 A | 10/1985 | Ogasawara | | |
| 4,567,347 A * | 1/1986 | Ito | ............ | G01S 17/48 |
| | | | | 219/124.34 |
| 4,580,026 A | 4/1986 | Stol | | |
| 4,594,497 A * | 6/1986 | Takahashi | ............ | B23K 9/127 |
| | | | | 219/124.34 |
| 4,628,182 A | 12/1986 | Hori | | |
| 4,631,385 A | 12/1986 | Rothermel | | |
| 4,667,083 A | 5/1987 | Stol | | |
| 4,667,106 A * | 5/1987 | Newman | ............ | G08B 17/11 |
| | | | | 250/381 |
| 4,711,986 A | 12/1987 | Lillquist et al. | | |
| 4,728,761 A | 3/1988 | Mucha | | |
| 4,767,911 A * | 8/1988 | Maram | ............ | B23K 9/0732 |
| | | | | 219/130.01 |
| 4,877,940 A * | 10/1989 | Bangs | ............ | B23Q 35/127 |
| | | | | 219/124.34 |
| 4,897,523 A | 1/1990 | Parks | | |
| 4,950,348 A | 8/1990 | Larsen | | |
| 4,954,691 A | 9/1990 | Parks | | |
| 4,973,821 A | 11/1990 | Martin | | |
| 5,001,326 A | 3/1991 | Stava | | |
| 5,025,145 A * | 6/1991 | Lagowski | ............ | G01R 31/2656 |
| | | | | 250/214 R |
| 5,043,557 A | 8/1991 | Tabata | | |
| 5,086,207 A * | 2/1992 | Deam | ............ | B23K 9/0956 |
| | | | | 219/130.01 |
| 5,101,086 A | 3/1992 | Dion | | |
| 5,118,028 A | 6/1992 | Ogawa | | |
| 5,121,339 A | 6/1992 | Jenuwine | | |
| 5,140,123 A | 8/1992 | Mitani | | |
| 5,148,001 A | 9/1992 | Stava | | |
| 5,208,433 A | 5/1993 | Hellegouarc | | |
| 5,270,516 A | 12/1993 | Hamamoto | | |
| 5,278,390 A | 1/1994 | Blankenship | | |
| 5,315,089 A | 5/1994 | Hughes | | |
| 5,319,179 A | 6/1994 | Joecks | | |
| 5,343,023 A | 8/1994 | Geissler | | |
| 5,349,156 A * | 9/1994 | Madigan | ............ | B23K 9/1062 |
| | | | | 219/130.01 |
| 5,352,871 A | 10/1994 | Ross | | |
| 5,367,138 A | 11/1994 | Moss | | |
| 5,378,873 A * | 1/1995 | Katzmann | ............ | G01R 19/03 |
| | | | | 219/483 |
| 5,412,184 A | 5/1995 | McGaffigan | | |
| 5,460,451 A * | 10/1995 | Wadman | ............ | B23K 26/032 |
| | | | | 219/502 |
| 5,461,215 A | 10/1995 | Haldeman | | |
| 5,466,916 A | 11/1995 | Iguchi | | |
| 5,475,198 A * | 12/1995 | Burke | ............ | B23K 9/1274 |
| | | | | 219/124.34 |
| 5,481,085 A * | 1/1996 | Kovacevic | ............ | B23K 9/1274 |
| | | | | 219/130.01 |
| 5,490,849 A * | 2/1996 | Smith | ............ | A61F 9/00804 |
| | | | | 219/121.6 |
| 5,504,309 A | 4/1996 | Geissler | | |
| 5,513,093 A * | 4/1996 | Corrigall | ............ | B23K 9/1006 |
| | | | | 219/130.1 |
| 5,526,561 A | 6/1996 | McGaffigan | | |
| 5,614,716 A * | 3/1997 | Rupert | ............ | G01J 5/16 |
| | | | | 219/494 |
| 5,651,903 A | 7/1997 | Shirk | | |
| 5,710,413 A | 1/1998 | King | | |
| 5,714,738 A | 2/1998 | Hauschulz | | |
| 5,739,506 A | 4/1998 | Hanton | | |
| 5,742,029 A | 4/1998 | Stava | | |
| 5,756,967 A | 5/1998 | Quinn | | |
| 5,773,799 A | 6/1998 | Maxfield | | |
| 5,783,799 A | 7/1998 | Geissler | | |
| 5,844,193 A | 12/1998 | Nomura | | |
| 5,963,022 A | 10/1999 | Buda | | |
| 5,968,587 A | 10/1999 | Frankel | | |
| 6,002,104 A | 12/1999 | Hsu | | |
| 6,008,470 A | 12/1999 | Zhang | | |
| 6,043,471 A | 3/2000 | Wiseman | | |
| 6,051,810 A | 4/2000 | Stava | | |
| 6,090,067 A | 7/2000 | Carter | | |
| 6,107,602 A | 8/2000 | Geissler | | |
| 6,115,273 A | 9/2000 | Geissler | | |
| 6,132,084 A * | 10/2000 | Whipple, III | ............ | G01J 5/041 |
| | | | | 219/711 |
| 6,155,475 A | 12/2000 | Ekelof | | |
| 6,169,263 B1 | 1/2001 | Derby | | |
| 6,177,649 B1 * | 1/2001 | Juret | ............ | B23K 26/032 |
| | | | | 219/121.63 |
| 6,204,476 B1 | 3/2001 | Reynolds | | |
| 6,248,976 B1 | 6/2001 | Blankenship | | |
| 6,265,688 B1 | 7/2001 | Lyshkow | | |
| 6,278,074 B1 | 8/2001 | Morlock | | |
| 6,292,715 B1 | 9/2001 | Rongo | | |
| 6,329,635 B1 * | 12/2001 | Leong | ............ | B23K 26/032 |
| | | | | 219/121.83 |
| 6,331,694 B1 | 12/2001 | Blankenship | | |
| 6,359,258 B1 | 3/2002 | Blankenship | | |
| 6,479,792 B1 | 11/2002 | Beiermann | | |
| 6,486,439 B1 | 11/2002 | Spear | | |
| 6,515,259 B1 | 2/2003 | Hsu | | |
| 6,583,386 B1 | 6/2003 | Ivkovich | | |
| 6,596,970 B2 | 7/2003 | Blankenship | | |
| 6,624,388 B1 | 9/2003 | Blankenship | | |
| 6,642,482 B2 | 11/2003 | Rappl | | |
| 6,670,579 B2 | 12/2003 | Davidson | | |
| 6,707,001 B1 | 3/2004 | Ulrich | | |
| 6,710,297 B1 | 3/2004 | Artelsmair | | |
| 6,720,529 B2 | 4/2004 | Davidson | | |
| 6,744,012 B2 | 6/2004 | Ueda | | |
| 6,747,247 B2 | 6/2004 | Holverson | | |
| 6,844,521 B2 | 1/2005 | Staufer | | |
| 6,849,828 B2 | 2/2005 | Aigner | | |
| 6,854,632 B1 | 2/2005 | Larsson | | |

(56) References Cited

U.S. PATENT DOCUMENTS

| | | |
|---|---|---|
| 6,906,284 B2 | 6/2005 | Kim |
| 6,909,067 B2 | 6/2005 | Davidson |
| 6,933,466 B2 | 8/2005 | Hutchison |
| 6,958,263 B2 | 10/2005 | Bhattacharyya |
| 6,974,931 B2 | 12/2005 | Holverson |
| 6,974,932 B2 | 12/2005 | Holverson |
| 6,984,806 B2 | 1/2006 | Huismann |
| 6,995,338 B2 | 2/2006 | Hutchison |
| 7,002,103 B2 | 2/2006 | Holverson |
| 7,015,419 B2 | 3/2006 | Hackl |
| 7,043,330 B2 | 5/2006 | Toyserkani |
| 7,107,118 B2 | 9/2006 | Orozco |
| 7,129,443 B2 | 10/2006 | Davidson |
| 7,145,101 B2 | 12/2006 | Tong |
| 7,244,905 B2 | 7/2007 | Das |
| 7,265,320 B2 | 9/2007 | Ou |
| 7,304,269 B2 | 12/2007 | Fulmer |
| 7,307,240 B2 | 12/2007 | Holverson |
| 7,351,933 B2 | 4/2008 | Huismann |
| 7,534,005 B1 * | 5/2009 | Buckman ............... A61F 9/068 2/8.2 |
| 7,683,290 B2 | 3/2010 | Daniel |
| 7,759,603 B2 | 7/2010 | Aigner |
| 7,766,213 B2 * | 8/2010 | Henrikson ........... B23K 9/0956 228/103 |
| 8,046,178 B2 | 10/2011 | Dai |
| 8,203,100 B2 | 6/2012 | Ueda |
| 8,288,686 B2 | 10/2012 | Kaufman |
| 8,487,215 B2 | 7/2013 | Holverson |
| 8,552,337 B2 | 10/2013 | Albrecht |
| 8,747,116 B2 * | 6/2014 | Zboray ................. G09B 19/24 219/130.21 |
| 9,095,930 B2 | 8/2015 | Albrecht |
| 9,217,731 B2 * | 12/2015 | Yamamoto ........... B23K 31/125 |
| 9,403,231 B2 | 8/2016 | Hutchison |
| 9,539,662 B2 | 1/2017 | Hutchison |
| 2002/0008095 A1 | 1/2002 | Norrish |
| 2002/0045970 A1 | 4/2002 | Krause |
| 2002/0107825 A1 | 8/2002 | Manicke |
| 2002/0117487 A1 | 8/2002 | Corby |
| 2002/0117488 A1 | 8/2002 | Arndt |
| 2003/0000931 A1 * | 1/2003 | Ueda .................... B23K 9/0735 219/124.02 |
| 2003/0058149 A1 | 3/2003 | Jayadeva |
| 2004/0010342 A1 | 1/2004 | Thelen |
| 2004/0069759 A1 | 4/2004 | Davidson |
| 2004/0182828 A1 | 9/2004 | Schmidt |
| 2004/0222204 A1 | 11/2004 | Hutchison |
| 2004/0238511 A1 | 12/2004 | Matus |
| 2005/0184039 A1 | 8/2005 | Stava |
| 2005/0218119 A1 * | 10/2005 | Kondo .................. B23K 9/205 219/98 |
| 2005/0269306 A1 | 12/2005 | Fulmer |
| 2006/0163229 A1 | 7/2006 | Hutchison |
| 2007/0051711 A1 | 3/2007 | Kachline |
| 2007/0084840 A1 | 4/2007 | Davidson |
| 2007/0102407 A1 | 5/2007 | Uezono |
| 2007/0170163 A1 | 7/2007 | Narayanan |
| 2007/0235434 A1 | 10/2007 | Davidson |
| 2007/0267394 A1 | 11/2007 | Beck |
| 2008/0006612 A1 * | 1/2008 | Peters .................... B23K 9/04 219/76.14 |
| 2008/0264916 A1 | 10/2008 | Nagano |
| 2008/0264917 A1 | 10/2008 | White |
| 2008/0264923 A1 | 10/2008 | White |
| 2009/0026188 A1 | 1/2009 | Schorghuber |
| 2009/0095720 A1 | 4/2009 | Kamei |
| 2009/0173726 A1 | 7/2009 | Davidson |
| 2010/0059493 A1 | 3/2010 | McAninch |
| 2010/0096373 A1 | 4/2010 | Hillen |
| 2010/0107725 A1 | 5/2010 | Iizuka |
| 2010/0133250 A1 | 6/2010 | Sardy |
| 2010/0176104 A1 | 7/2010 | Peters |
| 2010/0308026 A1 | 12/2010 | Vogel |
| 2010/0308027 A1 | 12/2010 | Vogel |
| 2010/0314371 A1 | 12/2010 | Davidson |
| 2011/0108527 A1 | 5/2011 | Peters |
| 2011/0114612 A1 | 5/2011 | Holverson |
| 2011/0163080 A1 | 7/2011 | Beck |
| 2011/0198317 A1 | 8/2011 | Lin |
| 2011/0204034 A1 | 8/2011 | Schartner |
| 2011/0297658 A1 | 8/2011 | Peters |
| 2011/0248007 A1 | 10/2011 | Takeda |
| 2012/0024828 A1 | 2/2012 | Oowaki |
| 2012/0061362 A1 | 3/2012 | Davidson |
| 2012/0074112 A1 | 3/2012 | Kotera |
| 2012/0097655 A1 | 4/2012 | Daniel |
| 2012/0248080 A1 | 10/2012 | Hutchison |
| 2012/0291172 A1 | 11/2012 | Wills |
| 2012/0298642 A1 | 11/2012 | Lambert |
| 2012/0325786 A1 | 12/2012 | Tolling |
| 2013/0112674 A1 | 5/2013 | Mnich |
| 2013/0112676 A1 | 5/2013 | Hutchison |
| 2013/0264323 A1 | 10/2013 | Daniel |
| 2013/0270245 A1 | 10/2013 | Holverson |
| 2013/0341311 A1 | 12/2013 | Albrecht |
| 2014/0021183 A1 | 1/2014 | Peters |
| 2014/0158669 A1 | 6/2014 | Davidson |
| 2014/0183176 A1 * | 7/2014 | Hutchison ............. B23K 9/322 219/124.02 |
| 2014/0251971 A1 | 9/2014 | Hearn |
| 2014/0263237 A1 | 9/2014 | Daniel |
| 2014/0263241 A1 | 9/2014 | Henry |
| 2014/0263243 A1 | 9/2014 | Marschke |
| 2014/0367370 A1 | 12/2014 | Hutchison |
| 2015/0001197 A1 | 1/2015 | Marschke |
| 2015/0083702 A1 | 3/2015 | Scott |
| 2015/0105898 A1 | 4/2015 | Adams |
| 2016/0074954 A1 | 3/2016 | Marschke |
| 2016/0144444 A1 | 5/2016 | Davidson |
| 2016/0167151 A1 | 6/2016 | Mehn |
| 2016/0288235 A1 | 10/2016 | Davidson |
| 2016/0318112 A1 | 11/2016 | Hutchison |

FOREIGN PATENT DOCUMENTS

| | | |
|---|---|---|
| CN | 1298778 | 6/2001 |
| CN | 1496774 | 5/2004 |
| CN | 1600486 | 3/2005 |
| CN | 1640603 | 7/2005 |
| CN | 1712168 | 12/2005 |
| CN | 1714978 | 1/2006 |
| CN | 1836818 | 9/2006 |
| CN | 1871093 | 11/2006 |
| CN | 101062530 | 10/2007 |
| CN | 201098775 | 8/2008 |
| CN | 101323046 | 12/2008 |
| CN | 101376191 | 3/2009 |
| CN | 101804495 | 8/2010 |
| CN | 101862886 | 10/2010 |
| CN | 102470473 | 5/2012 |
| CN | 102554418 | 7/2012 |
| CN | 102596475 | 7/2012 |
| CN | 102770228 | 11/2012 |
| CN | 202824943 | 3/2013 |
| CN | 103079740 | 5/2013 |
| DE | 1912344 | 6/1971 |
| DE | 1515281 | 3/1972 |
| DE | 2501928 | 7/1976 |
| DE | 2738066 | 3/1978 |
| DE | 19808383 | 9/1999 |
| DE | 102004015553 | 6/2005 |
| EP | 0194045 | 9/1986 |
| EP | 0387223 | 9/1990 |
| EP | 1232825 | 8/2002 |
| EP | 2218537 | 8/2010 |
| EP | 2286949 | 2/2011 |
| FR | 1443701 | 6/1966 |
| FR | 2867996 | 9/2005 |
| JP | 55-36746 | * 3/1980 |
| JP | S5719166 | 2/1982 |
| JP | S57109573 | 7/1982 |
| JP | S60108175 | 6/1985 |

(56) References Cited

FOREIGN PATENT DOCUMENTS

| | | |
|---|---|---|
| JP | S60108176 | 6/1985 |
| JP | S6471575 | 3/1989 |
| JP | H03285768 | 12/1991 |
| JP | H06277840 | 10/1994 |
| JP | H07204848 | 8/1995 |
| JP | H11156542 | 6/1999 |
| JP | 2001276971 | 10/2001 |
| JP | 2003311409 | 11/2003 |
| JP | 2005034853 | 2/2005 |
| JP | 2006205189 | 8/2006 |
| JP | 2009072814 | 4/2009 |
| JP | 4950819 | 6/2012 |
| KR | 1020120027764 | 3/2012 |
| SU | 872102 | 10/1981 |
| WO | 9640465 | 12/1996 |
| WO | 0132347 | 5/2001 |
| WO | 0153030 | 7/2001 |
| WO | 2005030422 | 4/2005 |
| WO | 2005056230 | 6/2005 |

OTHER PUBLICATIONS

International Search Report from PCT application No. PCT/US2015/028940, dated Oct. 5, 2015, 12 pgs.
Canadian Patent Office, Office Action, issued in connection with Canadian Patent Application No. 2,952,417, dated Jul. 3, 2019, 4 pages.
"ALT 304," Miller—The Power of Blue, Jun. 2001.
"Maxstar 200 SD, DX, and LX," Miller Electric Mfg. Co., Oct. 2003.
Bondy et al., "Graph Theory with Applications," Department of Combinatorics and Optimization, University of Waterloo, 1976, p. 7-8.

\* cited by examiner

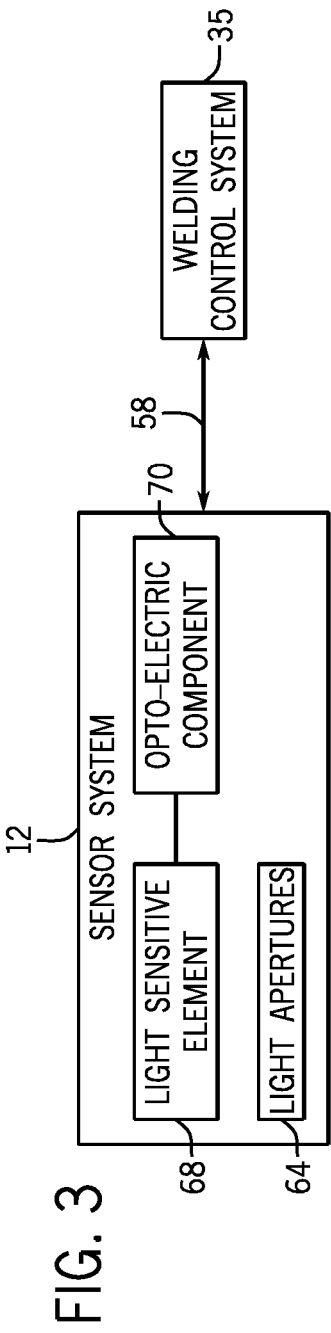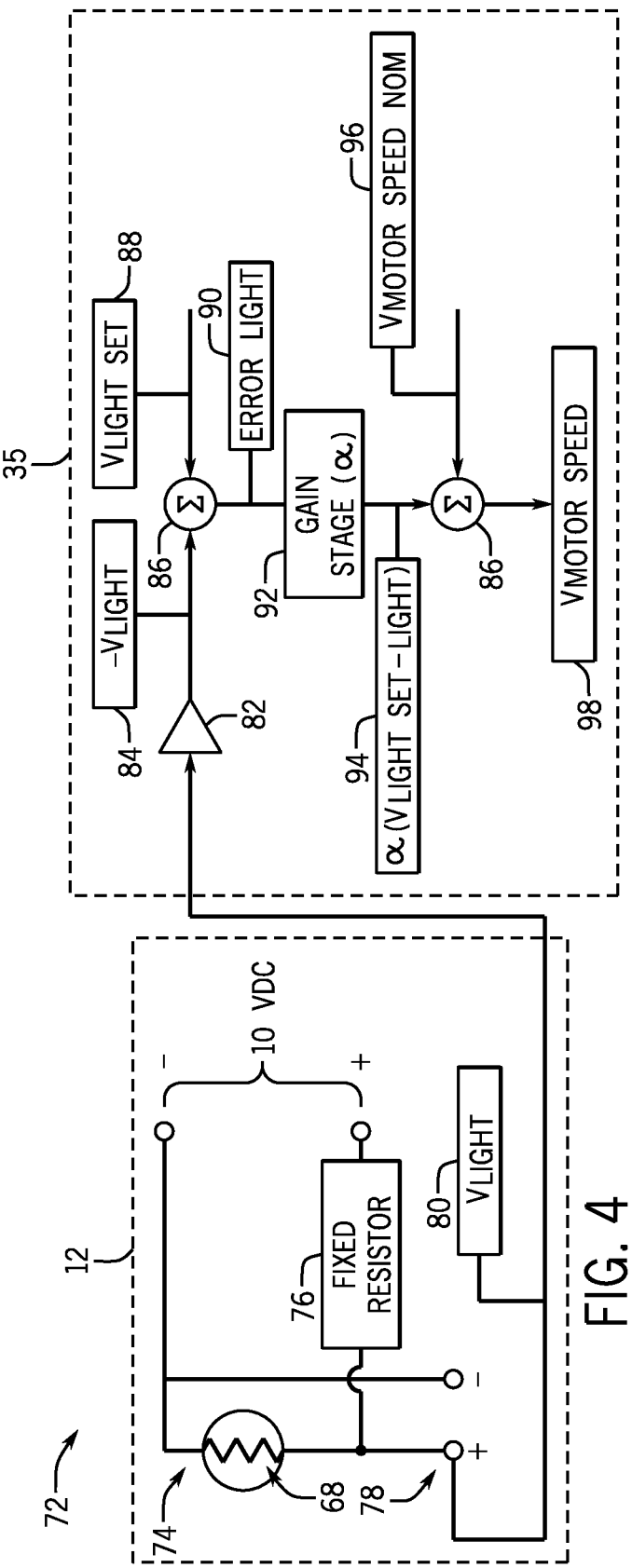

SYSTEMS AND METHODS FOR THE CONTROL OF WELDING PARAMETERS

BACKGROUND

The invention relates generally to welding systems, and more particularly, to systems and methods for controlling welding parameters of the welding system.

A wide range of welding systems and welding control regimes have been implemented for various purposes. In continuous welding operations, gas metal arc welding (GMAW) techniques allow for formation of a continuous weld bead by feeding filler material shielded by inert or active gas from a welding torch. Electrical power is applied to the welding wire and a circuit is completed through the workpiece to sustain an arc that melts the wire and the workpiece to form the desired weld. Certain related processes do not use shielding gas, and may rely upon constituents in the welding wire for forming and protecting the progressing weld.

In general, welding operations may be manual (e.g., the welding torch may be held and controlled by a human operator), and/or automated (e.g., the welding torch is manipulated by a robotic device). In either application, various welding parameters (e.g., voltage and current levels, wire feed speeds, travel speeds, etc.) are controlled to ensure an efficient and cost effective welding process. For example, in GMAW and related welding processes, various welding parameters are controlled to maintain a constant arc length. A constant arc length can provide a relatively consistent weld bead profile and weld penetration depth, thereby enhancing certain structural and aesthetic qualities of the weld. As a further example, the travel speed (e.g., rate of advancement of the torch to create the weld) may be regulated by the welding operator in manual operations, or it may be pre-set in advance for automated applications.

However, unpredictable variables in the welding environment make it difficult to accurately determine and control welding parameters. Accordingly, it may be beneficial to provide for systems and methods for controlling the various welding parameters based on a simple sensor feedback system.

BRIEF DESCRIPTION

In one embodiment, a welding system including a welding torch, a power supply, one or more sensors, and a controller is provided. The welding torch advances an electrode toward a workpiece in a first direction. The power supply provides a flow of electricity to the electrode for generating a welding arc between the electrode and the workpiece. Generating the welding arc generates a weld puddle behind the welding arc as the electrode moves in the first direction. The sensor generates a voltage output signal based on the amount of light received from the weld puddle. The controller is communicatively coupled with the sensor to receive the voltage output signal, and the sensor controls a welding parameter of the welding system based the voltage output signal.

In another embodiment, a method is provided. The method includes detecting, via a light sensor, an intensity of light emitted/reflected from a weld puddle. The weld puddle is formed behind a welding arc that is produced between a welding torch and a workpiece of a welding system. The method also includes determining, via an opto-electric component disposed within the light sensor, a voltage output signal. The voltage output signal is related (e.g., inversely related) to a light intensity of the weld puddle. The method also includes transmitting, via the light sensor, the voltage output signal to a controller of a welding system. The controller of the welding system is configured to control a welding parameter of the welding system based on the voltage output signal.

In another embodiment, a welding system with control circuitry is provided. The control circuitry receives a signal indicative of a light intensity of a weld puddle. The weld puddle is formed behind a welding arc that is produced between a welding torch and a workpiece of a welding system. The control circuitry processes the signal indicative of the light intensity to monitor an operating parameter of the welding system and determines a control signal based on the operating parameter. The control signal is configured to adjust or update a welding parameter of the welding system.

DRAWINGS

These and other features, aspects, and advantages of the present invention will become better understood when the following detailed description is read with reference to the accompanying drawings in which like characters represent like parts throughout the drawings, wherein:

FIG. 3 is a block diagram of an embodiment of the sensor system of FIG. 1 communicatively coupled to a control system of the welding system of FIG. 1, in accordance with an embodiment;

FIG. 4 is a block diagram of an embodiment of feedback loop utilized by the welding system of FIG. 1 to control various welding parameters, in accordance with an embodiment.

DETAILED DESCRIPTION

Embodiments of the present disclosure are directed toward systems and methods for controlling welding system parameters based on a light intensity of a weld pool (e.g., weld puddle) behind the welding arc produced by the welding system. In particular, a simple sensor system is positioned in proximity to the weld pool and is disposed in a manner that allows light to easily impinge upon it as the penetration depth of the weld is increased. In response to the light received, the sensor system produces an electrical output that is related to a welding parameter (e.g., penetration depth of the weld, height of a welding bead, etc.) achieved during the welding process. For example, the electrical output may be proportionally related, inversely related, directly related, etc. Specifically, the sensor system includes an opto-electrical component (e.g., photo-resistor, photo-voltaic, or photo-diode) with electrical characteristics that change in relationship to a magnitude of the light received from a sensing area (e.g., area behind the welding arc). In certain embodiments, the sensor system includes one or more apertures that focus the sensing area of the sensor system to the region of the weld pool (e.g., weld puddle) that is behind the welding arc. In this manner, the sensor system provides sensor feedback information of the welding process via a simple analog electric circuit and/or digital algorithm that can be implemented on an inexpensive microprocessor.

In certain embodiments, a monitoring system disposed within a welding control system of the welding system receives the electrical output (e.g., feedback signals) from the sensor system, and processes the received signals. Based on the sensor feedback, the welding control system can make adjustments to welding components and/or operating parameters to correct for deviations and/or errors in the welding process. For example, if the penetration depth of the weld is too great during the welding process, the welding control system can utilize the sensor feedback to compensate for the deviation and increase the travel speed of the welding torch. Conversely, if the penetration depth of the weld is too shallow, the welding control system can utilize the sensor feedback to compensate for the deviation and decrease the travel speed of the welding torch.

Figure 1:
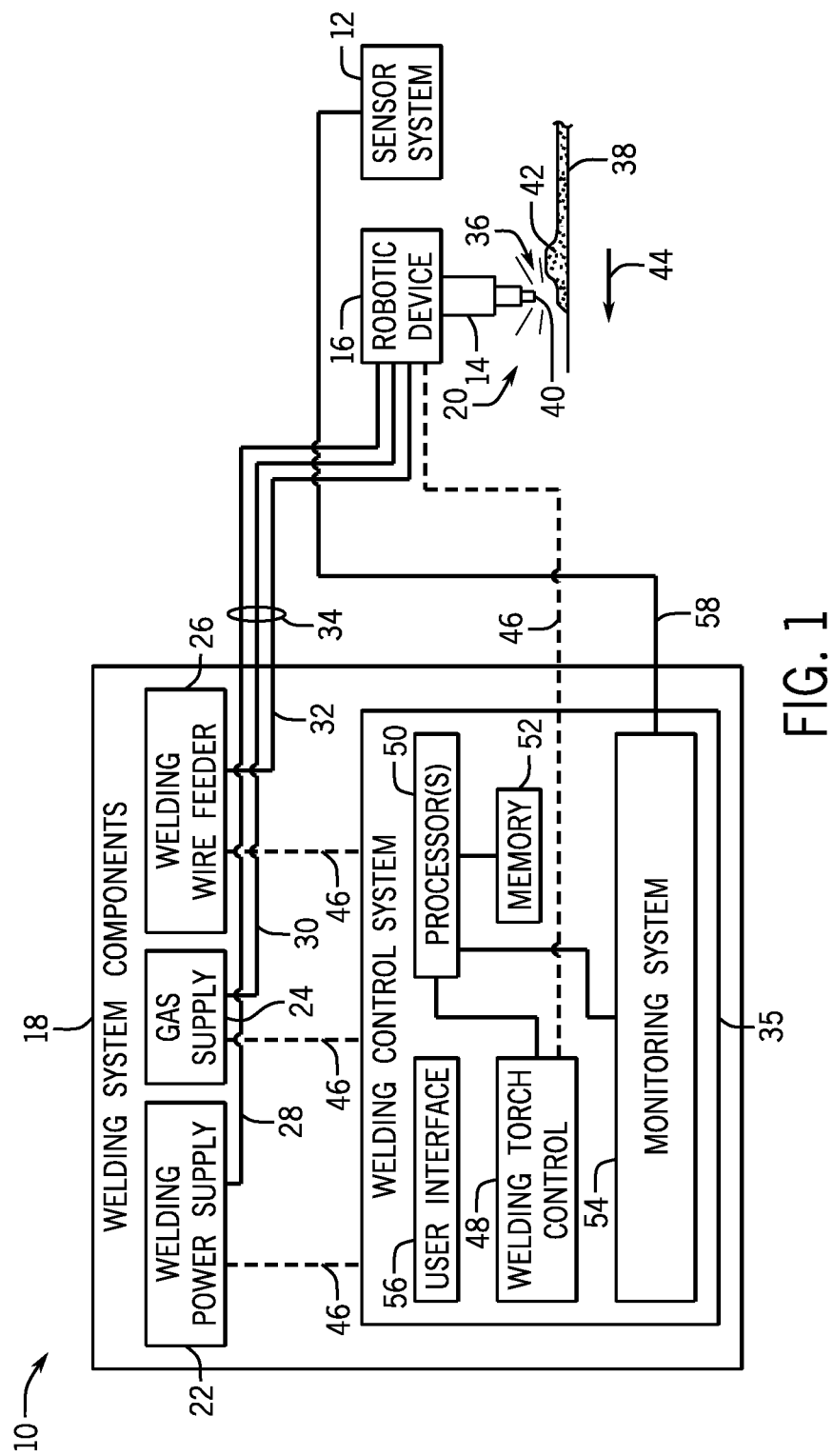
FIG. 1 is a block diagram of an embodiment of a welding system that may employ a sensor system for monitoring welding parameters, in accordance with an embodiment.

FIG. 1 is a block diagram of an embodiment of a welding system 10 that utilizes a sensor system 12 for monitoring welding parameters, in accordance with an embodiment. The illustrated embodiment depicts an automated welding system 10, with an automatic welding torch 14 that is manipulated by a robotic device 16. However, it should be noted that aspects of the embodiments described herein may be applicable to a manual welding system, such as any manual welding system where the welding torch 14 is held and controlled by a human operator.

The welding system 10 includes various components (e.g., welder 18) that provide supplies, such as welding wire, power, and so forth, to a welding operation 20 being performed by the robot 16. In the illustrated embodiment, the welder 18 includes a welding power supply 22, a gas supply 24, and a wire feeder 26 that supply power through a cable 28, gas through a cable 30, and wire through cable 32, respectively, to the welding torch 14 for use in the welding operation 20. It should be noted that in some embodiments, the cables 28, 30, and 32 may be combined into a single cable 34 that couples the welder 18 to the welding torch 14. In addition, the welder 12 also includes a welding control system 35 that is configured to control various aspects of the automatic welding system 10. For example, the amount of power, gas, and wire provided to the welding torch 14 may be regulated by the control system 35 based on the welding process, and/or based on various sensor feedback received from the sensor system 12.

The welding system 10 utilizes the various components 18 to produce a welding arc 36 on a workpiece 38. The welding arc 36 may be of any type of weld, and may be oriented in any desired manner, including MIG, metal active gas (MAG), various waveforms, tandem setup, and so forth. In particular, the power supply 22 provides a flow of electricity to the welding wire 40 (supplied by the wire feeder 26), which acts as an electrode. The welding wire 40 is fed through the welding torch 14 to form the welding arc 36, melted by the welding arc 36, and deposited on the workpiece 38. In addition, the workpiece 38 is coupled to the power supply 22 by a clamp connected to a work cable (not illustrated) to complete an electrical circuit when the welding arc 36 is established between the welding wire 40 and the workpiece 38. Placement of the welding torch 14 at a location proximate to the workpiece 38 allows electrical current, which is provided by the power supply 22 and routed to the welding torch 14, to arc from the welding wire 40 to the workpiece 38. As described above, this arcing completes an electrical circuit that includes the power supply 22, the welding torch 14, the workpiece 38, and the work cable. Particularly, in operation, electrical current passes from the power supply 22, to the welding torch 14, and to the workpiece 38, which is typically connected back to the power supply 22. The arcing generates a relatively large amount of heat that causes part of the workpiece 38 and the filler metal of the welding wire 40 to transition to a molten state. In particular, a weld puddle 42 in the molten state is formed behind the welding torch 14 as the torch 14 moves in a forward direction 44.

To shield the weld area from being oxidized or contaminated during welding, to enhance arc performance, and to improve the resulting weld, the welding system 10 also may feed an inert shielding gas to the welding torch 14 from the gas source 24. It is worth noting, however, that a variety of shielding materials for protecting the weld location may be employed in addition to, or in place of, the inert shielding gas, including active gases and particulate solids.

As noted above, the control system 35 control one or more welding parameters of the welding system 10. For example, the control system 35 is configured to regulate the amount of power, gas, or wire provided to the welding torch 14 via the cables 28, 30, or 32, respectively. Indeed, one or more control signals 46 between the control system 35 and other components of the welder 18 (e.g., the welding power supply 22, the gas supply 24, welding wire feeder 26, etc.) are used to regulate and control the timing and quantity of these supplies. For example, the control system 35 may control the welding power output that is applied to the welding wire 40 for carrying out the desired welding operation.

In certain embodiments, the control system 35 controls the one or more welding parameters in response to sensor feedback received from the sensor system 12. The sensor system 12 may provide signals relating to an operating parameter of the welding system, such as current, voltage, or light intensity of the welding arc 12. For example, the sensor system 12 includes one or more sensors located throughout the welding system 10, such as, for example, sensors disposed proximate to the welding torch such that the sensors react a magnitude of light of the weld puddle 42. Based on these detected parameters within the welding process, the control system 35 may output control signals to various components of the welding system 12 to adjust one or more welding parameters. For example, based on the sensor feedback, a welding torch control 48 disposed within the control system 35 may regulate the robotic device 16 coupled to the welding torch 14 to increase or decrease a travel speed of the torch 14. Other welding parameters may include the current provided to the welding wire 24, the voltage of the flow of electricity provided to the welding wire 24, welding wire feed speed, and so forth.

The control system 35 also includes one or more processors 50 (e.g., processing circuitry 50) and memory 52 (e.g., memory circuitry 52), and may be communicatively coupled to the welding torch control 48 and the monitoring system 54. The monitoring system 54 receives one or more feedback signals from the sensor system 12. The sensor system 12 may be a single sensor or an array of sensors used to detect the light emitted from the welding arc 36, such as for example, the light emitted/reflected/by the weld puddle 42. Based on the feedback signals received, the processing circuitry 50 may execute instructions stored in the memory circuitry 52 to generate one or more control signals to provide to the welding torch control 48, the welding power supply 22, the gas supply 24, the welding wire feeder 26, and so forth. Specifically, based on the control signals, the control system 35 may continuously adjust parameters of the welding system 10, such as the power supplied to the welding wire 40 or the speed of the welding torch 48, in order to maintain certain welding parameters. As an example, it may be desirable to maintain a certain penetration depth of the weld or a certain height of the weld puddle 42, and these parameters may be maintained approximately constant or consistent based on the sensor feedback from the sensor system 12. The various sensors may generate signals indicative of the different detected properties at a predetermined interval, and the processing circuitry may receive and process the sensor signals to output control signals nearly instantaneously. This may allow for relatively instantaneous control of the welding process.

Further, the control system 35 includes a user interface 56 that may allow for selection of settings such as the type of weld process, the type of wire to be used, welding parameter settings, and so forth. In particular, the user interface 56 may be utilized by a welding operator to input various thresholds, beginning values, ideal values, for the one or more welding parameters regulated by the welding system 10. For example, the user may input a certain threshold height of the weld puddle 42, and the processing circuitry 50 may utilize the sensor feedback to regulate the height of the weld puddle 42 based on the threshold.

Figure 2:
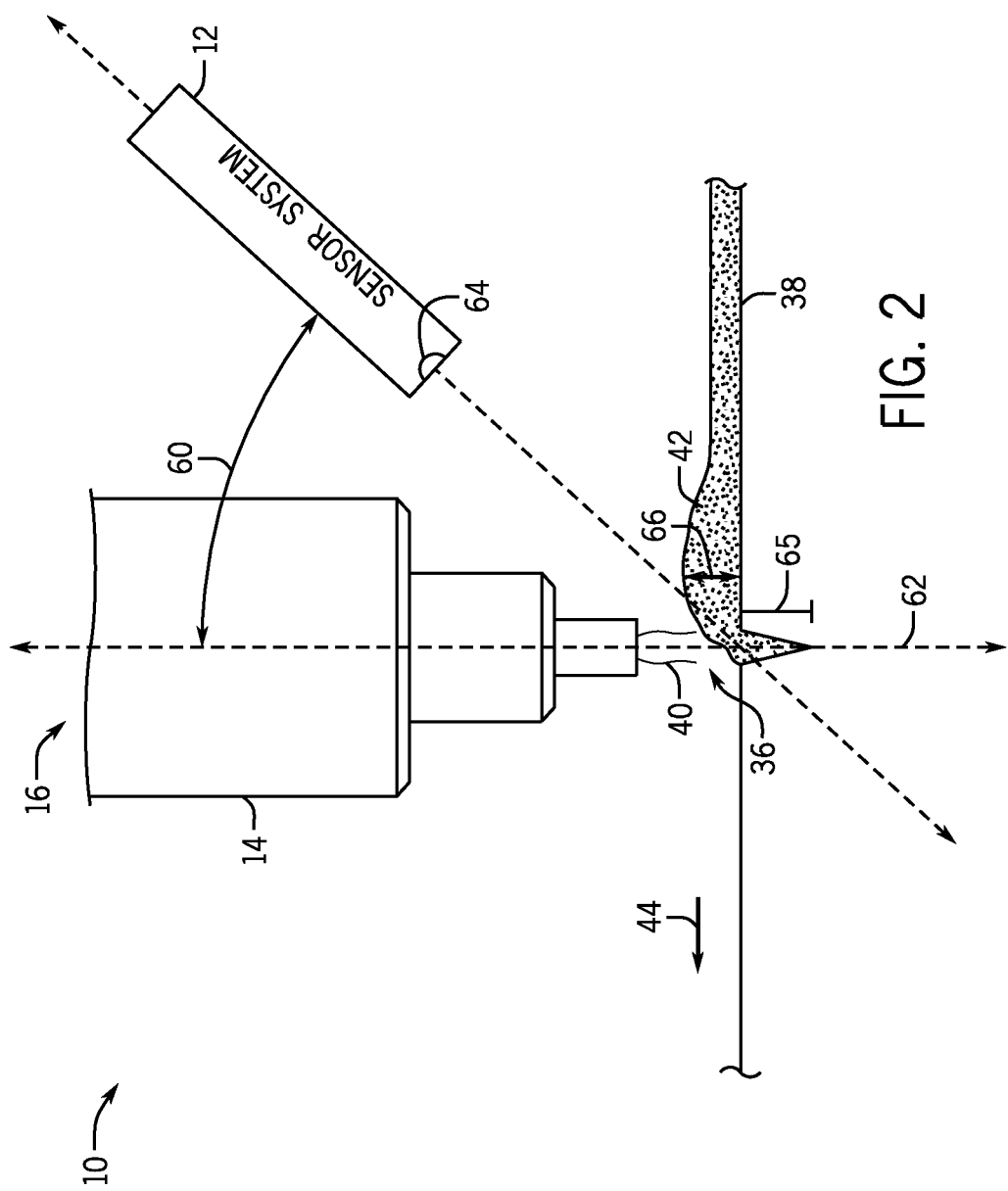
FIG. 2 is a perspective view of an embodiment of the sensor system of FIG. 1 used to detect a light intensity during the welding process, in accordance with an embodiment.

FIG. 2 is a perspective view of an embodiment of the sensor system 12 of FIG. 1, where the sensor system 12 is used to detect a light intensity of the weld puddle 42 during the welding process, in accordance with an embodiment. In particular, in some embodiments, the sensor system 12 is positioned in proximity to the welding torch 14, in a manner that allows the light emitted/reflected from the weld puddle 42 to be captured by sensor system 12. For example, the sensor 12 can be positioned such that it is able to monitor the molten weld puddle 42 behind the welding arc 36 that is formed during the welding process. Indeed, the sensor 12 may be disposed anywhere within the welding system 10 (e.g., behind, next to, around, or near the arc 36, the torch 14, the robotic arm 16, or the welding operator, etc.), so long as it receives an amount of light from the weld puddle 42 of the welding process.

Light from the welding arc 36 (e.g., the weld puddle 42) may be intercepted by the sensor system 12, which converts the detected light intensity to an electronic signal that is sent to the control system 35 for processing. In the illustrated embodiment, the sensor system 12 communicates the feedback signal to the control system 35 via a wire 58 (as illustrated in FIG. 1). In other embodiments, however, the sensor system 35 may communicate the signal wirelessly. The sensor system 12 may include any device capable of outputting an electrical signal in response to incident light. For example, the sensor system 12 may include one or more optical sensors and one or more opto-electrical components, such as photovoltaic cells, photodiodes, photo-resistive elements, or a combination thereof. In some embodiments, the sensor system 12 may be configured to output an electrical signal that is linearly proportional to the detected light. In other embodiments, non-linearity within the light sensor 48 may be mapped to a corresponding linearizing function via the control system 35.

In some embodiments, the sensor system 12 may be disposed around the welding torch 14 in a specific position and/or orientation that allows it to detect the magnitude of the light from the weld puddle 42. For example, the sensor system 12 may be disposed at an angle 60 relative to an axis 62 (e.g., a central axis 62 of the welding torch 14) approximately perpendicular to the workpiece 38. In particular, the angle 60 may be between approximately 15° and 30°, between approximately 10° and 40°, or between approximately 5° and 50°. Further, the angle 60 of the sensor system 12 may be away from the axis 62 in a direction opposite to the direction of travel 44 (e.g., forward direction 44) of the torch 14. The angle 60 of the sensor system 12 may be adjusted to ensure that a maximum amount of light emitted/reflected from the weld puddle 42 is gathered by the sensor system 12.

In certain embodiments, the angle 60 of the sensor system 12 may be adjusted such that the light emitted/reflected from the weld puddle 42 is not obscured and/or overpowered by other light emitted during the welding process, such as light directly from the welding arc 36. The sensor system 12 includes one or more apertures 64 (e.g., pin holes 64, operable windows, etc.) that focus the sensing area of the sensor system 12 to the region of the weld puddle 42 (e.g., weld pool) that is behind the welding arc 36. In particular, the light incident upon the aperture 64 is related to the penetration depth of the weld 65 (or, conversely, to a height 66 of the weld puddle 42). The penetration depth of the weld 65 and the height 66 of the weld puddle 42 may be relative to the surface of the workpiece 38. The geometry of the aperture 64 is configured so that as the depth of penetration of the weld 65 is increased, the amount of light received by the sensor system 12 increases. Indeed, as the penetration depth of the weld 65 increases, the weld puddle 42 tends to be less convex, and this allows more of the light from the weld puddle 42 to be reflected to the sensor 12. In some situations, increased penetration depth 65 of the weld causes the arc column 36 to move down, allowing some of the light from the arc 36 to come into direct view of the sensor system 12.

FIG. 3 is a block diagram of an embodiment of the sensor system 12 of FIG. 1 communicatively coupled to the control system 35, in accordance with an embodiment. As noted above, the sensor system 12 includes one or more light apertures 64, a light sensitive element 68 (e.g., optical sensor 68), and one or more opto-electrical components 70 (e.g., photo-resistor, photo-voltaic, or photo-diode). The resistance of the opto-electrical component 70 changes in response to the magnitude of light incident on the light sensitive element 68. Typically, the resistance value of the component 70 is reduced in proportion to the amount of light that impinges upon it, and may include circuitry configured to convert incident light detected by it into an electrical signal.

Accordingly, the sensor system 12 provides a voltage output to the monitoring system 54 of the control system 35 based upon the amount of light picked up from the weld puddle 42. The sensor system 12 may be configured with wired communications (e.g., wire 58) and/or wireless communications with the control system 35. Further, as noted above with respect to FIG. 1, the control system 35 controls the one or more welding parameters in response to sensor feedback received from the sensor system 12. In some embodiments, the control system 35 may evaluate the sensor feedback, and may determine which control signals and which welding parameters should be altered, if any, to maintain a consistent and efficient welding process. For example, to maintain a desired arc length, the wire feed speed of the wire feeder 26 may be adjusted.

FIG. 4 is a block diagram of an embodiment of feedback loop 72 utilized by the welding system of FIG. 1 to control various welding parameters. In particular, once the welding system 10 has been activated and a welding operation has begun, the feedback loop 72 may be utilized by the welding control system 35 to obtain sensor feedback from the sensor system 12, adjust one or more welding parameters based on the sensor feedback via one or more control signals, and obtain updated sensor feedback from the sensor system 12 based on the updated welding operation. The feedback loop 72 may include various sensor feedback information (e.g., a signal related to the magnitude of the light emitted/reflected from the weld puddle 42) and various operating parameters (e.g., a voltage level, a weld current level, a travel speed, a wire feed speed, a power supply, a gas supply, etc.), or any combination thereof. In particular, the feedback loop 72 may be utilized to detect whether sensor feedback indicates deviations from a consistent welding process and/or welding defects. In certain embodiments, this typically involves a comparison of the feedback data, or data derived from the feedback data, to known "good weld" characteristics, known defect signatures, pre-set thresholds, limits, or values, or a combination thereof.

The feedback loop 72 includes first obtaining sensor feedback information from various components of the sensor system 12. For example, the illustrated embodiment depicts a photo-resistor 74 as the opto-electrical component 70 of the sensor system 12. Further, the illustrated embodiment includes a fixed resistor 76 the voltage across which changes based on a magnitude of light (e.g., radiation) incident upon the light sensitive element 68. As noted above, the resistance value of the opto-electrical component 70 is reduced in proportion to the amount of light that impinges on the light sensitive element via the apertures 64. Accordingly, in this example, the photo-resistor 74 and the fixed resistor 76 establish a voltage divider circuit such that the voltage across the photo-resistor 74 is reduced in direct proportion to the light incident upon it. This configuration may be beneficial for representing a relationship between a sensor voltage output 78 and the height 66 of the weld puddle 42. For example, as the penetration depth 65 and/or the height of the weld puddle 66 increases, a greater amount of light is incident upon the sensor system 12, there is a greater drop in sensor voltage. It should be noted that other configurations of the photo-resistor 74 may be beneficial for clearly showing other welding parameter relationships, and such configurations may be easily implemented within the embodiments described herein.

As noted above, the sensor voltage output 78 may be transmitted to the control system 35. The processor 50 may utilize the sensor feedback information received to determine adjustments to one or more welding parameters of the welding system 10. In the illustrated embodiment, the feedback loop 72 is configured for the adjustment of the travel speed of the welding torch 14. For example, the processor 50 may take the negative of the actual light 80 (e.g., $V_{light}$ 80) via an inverter 82 to obtain $-V_{light}$ 84. Further, the negative of the actual light ($-V_{light}$ 84) is summed, via a Σ function 86, with a light sensor voltage representative of a desired penetration level 88 (e.g., $V_{light\ set}$ 88). The desired penetration level 88, or any desired thresholds, limits, or level of other welding parameters, may be pre-set and stored within the memory 52 by a welding operator via the user interface 56. The sum of the negative of the actual light ($-V_{light}$ 84) with a light sensor voltage representative of a desired penetration level (e.g., $V_{light\ set}$ 88) produces an error term (ERROR$_{light}$ 90). This error term is then multiplied by a gain factor 92 and the result (e.g., $\alpha(V_{light\ set}-V_{light})$ 94) is summed, via the Σ function 86, with a voltage representing the nominal motor speed set point (e.g., $V_{motor\ speed\ nom}$ 96).

In some embodiments, if the sensor feedback 80 is lower than the set point 88 (indicating that the depth of the penetration 65 is too high), the error term 90 will be positive and a determined motor speed 98 (e.g., $V_{motor\ speed}$ 98) of the welding torch 14 will be increased from the nominal motor speed 98 to compensate for the increased depth of penetration 65. Likewise, if the sensor feedback 80 is greater than the set point 88 (indicating that the depth of the penetration 65 of the weld is too low), the error term 90 will be negative and the determined motor speed 98 (e.g., $V_{motor\ speed}$ 98) will be reduced from the nominal set point 98. In this manner, the travel speed of the welding torch 14 may be regulated by the control system 35 via one or more control signals to maintain a relatively constant penetration depth throughout the weld. Further, is should be noted that parameters other than travel speed (e.g., wire feed speed, arc power, etc.) could be employed to maintain constant penetration depth of the weld based upon the sensor feedback.

In particular, is should be noted that the embodiments described herein can be processed with a simple analog electrical circuit or digital algorithm that can be implemented on an inexpensive microprocessor. Indeed, in some embodiments, certain benefits of the present embodiments include the simplicity of the processing techniques utilized to determine parameters of the welding process (e.g., depth of penetration, height of weld puddle, etc.). In some situations, more complex optical sensing systems are utilized (e.g., cameras), which may require specialized vision analysis software to process the optical feedback received.

Figure 5:
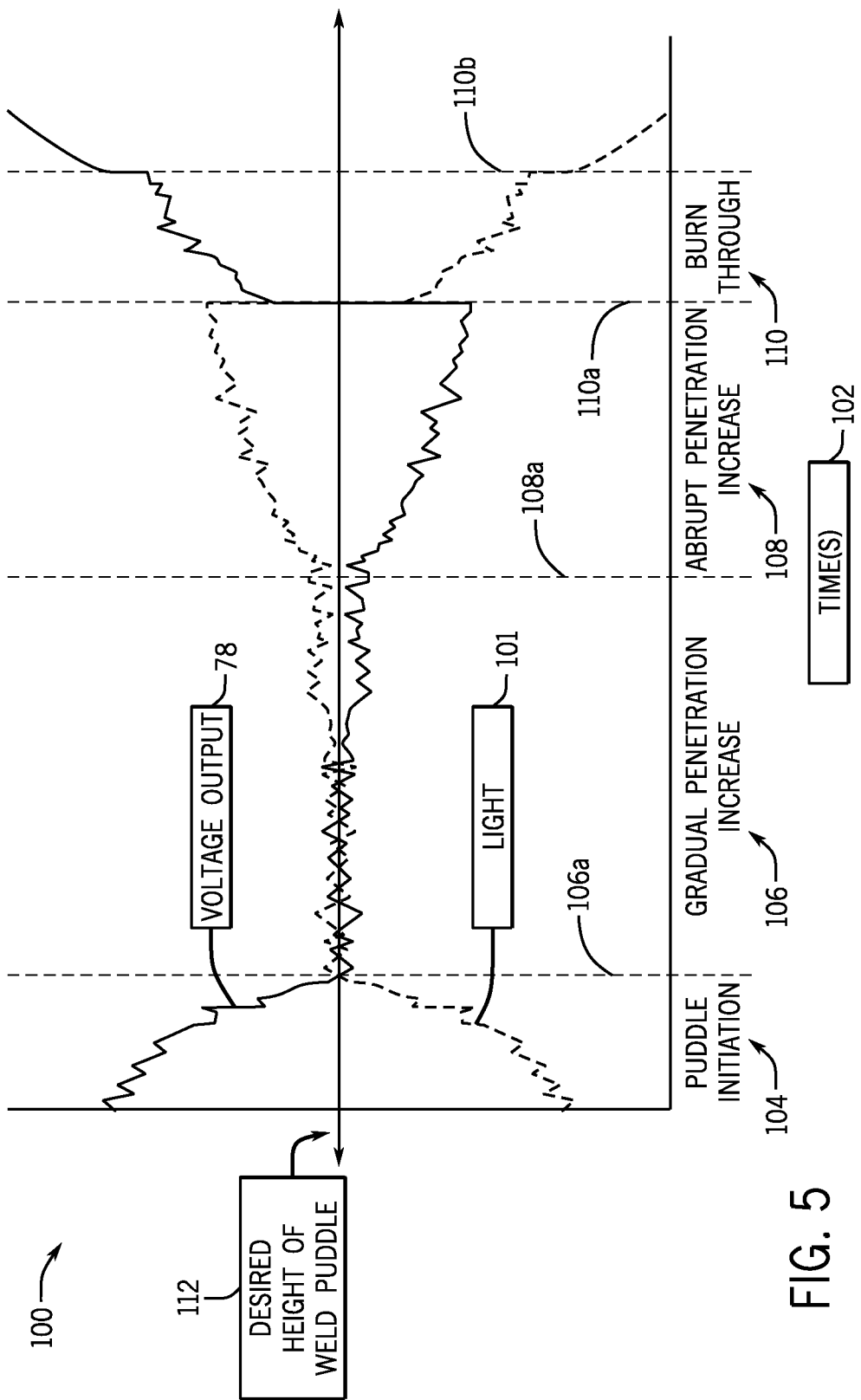
FIG. 5 is a plot of an embodiment illustrating the relationship between a voltage output of the sensor system of FIG. 1 and welding parameters of the welding process.

FIG. 5 is a plot 100 of an embodiment illustrating the relationship between the voltage output 78 of the sensor system 12, a magnitude of light 101 and/or radiation 101 incident upon the sensor system 12, the penetration depth 65 of the weld and/or the height 66 of the weld puddle 42. The timescale 102 of the plot 100 is divided into different time periods (e.g., a weld puddle initiation 104, a gradual penetration increase 106, an abrupt penetration increase 108, and a burn through 110) to illustrate this relationship between the voltage output 78, the penetration depth 65 of the weld and/or the height 66 of the weld puddle 42, and the magnitude of light incident upon the sensor system 12. As mentioned above, such as with respect to the feedback loop 72 of FIG. 4, the sensor voltage output 78 of the sensor system 12 can be correlated to the penetration depth 65 of the weld and/or the height 66 of the weld puddle 42. For example, as the penetration depth 65 and/or the height of the weld puddle 66 increases, the amount of light 101 incident upon the sensor system 12 increases, and the corresponding sensor voltage output 78 decreases.

Accordingly, in the illustrated embodiment, as a magnitude of the light 101 increases (e.g., the amount of light 101 incident upon the sensor system 12), the voltage output 78 decreases. For example, during the weld puddle initiation, the amount of light 101 incident upon the sensor system 12 gradually increases, leading to a gradual decrease in the voltage output 78. In some situations, the operator and/or the robotic device 16 may initiate a gradual increase in penetration depth, as illustrated by the time point 106*a*. Further, during the time period where the welding torch 14 gradually increases penetration depth (e.g., time period 106), the amount of light 101 and the voltage output 78 reflect a somewhat steady balance. Specifically, during the time period 106, the sensor system 12 may receive light reflected and/or emitted by the weld puddle 42. In particular, during this time period, the height 66 of the weld puddle 42 is generally around a desired height threshold 112. However, with the initiation of an abrupt increase in penetration depth, as indicated by the time point 108*a*, the sensor system 12 may begin to receive light from the weld puddle 42 and/or the welding arc 36. Accordingly, during the period of time where there is an abrupt penetration increase, (e.g., time period 108), the light 101 incident upon the sensor system 12 abruptly increases and the voltage output 78 of the sensor system 12 abruptly decreases.

In certain embodiments, the control system 35 may receive feedback signals related to the voltage output 78. Further, the control system 35 may process these signals, and take appropriate measures to correct for deviations in the welding process, such as if there are abrupt penetration depth increases, as illustrated in time period 108. For example, the control system 35 may transmit one or more signals to increase the travel speed of the welding torch 14 in order to correct for the abrupt increase in welding penetration 108. In the event that such adjustments are not taken, the welding process can lead to errors, such as a burn through incident (e.g., time period 110). These incidents may occur if excessive heat causes excess weld metal to penetrate through the location of the weld. That is, excess penetration may have occurred due to factors such as excess wire feed speed, excessively slow travel speed, and so forth. In some burn through incidents, the light disperses the welding location, leading to a sudden voltage output 78 increase.

Accordingly, it may be beneficial to detect an inception of the burn through incident, as indicated by the time point 110*a*, before the completion of the burn through incident, as indicated by the time point 110*b*. The inception of the burn through incident 110*a* is approximately around the time 102 where the amount of light 101 begins to disperse, such that the sensor system 12 receives less emitted and/or reflected light from the welding arc 32 and/or the weld puddle 42. Further, in some situations, the burn through incident 110 is at a completion (e.g., time point 110*b*) when the amount of light 101 received by the sensor is less than the amount of light received by the sensor system 12 during the puddle initiation 104.

Present embodiments of the light system 12 may be used to control welding parameters in both fully automated, semi-automatic, and manual welding systems 10. More specifically, the light system 12 may be positioned proximate to the welding torch 14 that is manipulated either robotically or manually by an operator. In some manual welding situations, the operator may respond to various audible or visual alerts or warnings provided by the control system 35 when the processing circuitry 50 determines that one or more welding parameter adjustments are needed based on the sensor feedback received. Further, the operator may take corrective measures, such as increasing or decreasing the travel speed of the welding torch 14 or any other parameter, in response to the alerts and warnings.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
   a welding torch configured to advance an electrode toward a workpiece, the electrode configured to generate a welding arc between the electrode and the workpiece during welding;
   a power supply configured to provide a flow of electricity to the electrode for generating the welding arc between the electrode and the workpiece to form a weld, wherein generating the welding arc generates a weld puddle behind the welding arc;
   a radiation sensor configured to detect radiation in a region of the weld puddle and to generate an output signal based on an amount of the radiation detected, wherein an amplitude of the output signal is inversely related to the amount of the radiation detected; and
   a controller in electrical communication with the radiation sensor, the controller configured to receive the output signal and to control a welding parameter of the welding system based upon the output signal to control the penetration depth of the weld relative to the surface of the workpiece.

2. The welding system of claim 1, wherein the controller is configured to control the welding parameter to maintain the penetration depth of the weld relative to the surface of the workpiece, or maintain the height of the weld puddle relative to the surface of the workpiece.

3. The welding system of claim 1, wherein the radiation sensor comprises a radiation sensitive element and an opto-electrical component, the opto-electrical component having an electrical characteristic that changes in response to the amount of the radiation detected by the radiation sensitive element.

4. The welding system of claim 3, wherein the opto-electrical component comprises at least one of a photovoltaic cell, a photodiode, or a photo-resistive element.

5. The welding system of claim 4, wherein the opto-electrical component comprises the photo-resistive element having a resistance value that decreases in proportion to the amount of the radiation detected.

6. The welding system of claim 5, wherein the radiation sensor is configured to generate the output signal based on the resistance of the photo-resistive element.

7. The welding system of claim 5, wherein the radiation sensor further comprises a fixed resistor in electrical communication with the photo-resistive element, such that the fixed resistor and photo-resistive element establish a voltage divider circuit.

8. The welding system of claim 1, wherein the controller is configured to detect a change rate of the amplitude of the output signal, and configured to control the welding parameter in response to the change rate being greater than a threshold, so as to prevent-a burn through event.

9. The welding system of claim 1, wherein the welding parameter comprises a parameter of a wire feeder, a power supply, a gas supply, a robotic device, or the welding torch.

10. The welding system of claim 1, wherein the radiation sensor comprises one or more apertures configured to limit a detection area of the radiation sensor, wherein the detection area is configured to receive the radiation from the region of the weld puddle.

11. The welding system of claim 10, wherein the radiation received by the one or more apertures is related to the penetration depth of the weld or the height of the weld puddle relative to the surface of the workpiece.

12. The welding system of claim 10, wherein a geometry of the one or more apertures is configured such that the amount of the radiation received by the radiation sensor increases as the penetration depth of the weld increases.

13. The welding system of claim 1, wherein the welding parameter comprises a travel speed of the welding torch, a current or voltage of the flow of electricity provided to the electrode, or a wire feed speed.

14. The welding system of claim 1, wherein the radiation sensor is positioned at an angle with respect to a central axis of the welding torch such that the radiation from the weld puddle is not obscured or overpowered by radiation from the welding arc, wherein the angle with respect to the central axis of the welding torch is between 5 and 50 degrees.

15. The welding system of claim 14, wherein the angle with respect to the central axis of the welding torch is between 15 and 30 degrees.

16. The welding system of claim 1, wherein the controller is configured to generate an error signal based on a sum of the output signal and a set signal, the set signal being representative of a set penetration depth, and wherein the controller is configured to control the welding parameter based on the error signal.

17. The welding system of claim 16, wherein the welding parameter comprises a travel speed of the welding torch, wherein the controller is configured to increase the travel speed of the welding torch in response to a positive error signal and decrease the travel speed in response to a negative error signal.

18. The welding system of claim 1, wherein the controller comprises an analog electrical circuit or a processor implementing a digitally defined algorithm.

19. A welding system, comprising:
  an arc welding torch configured to generate a welding arc between an electrode of the arc welding torch and a workpiece to form a weld, the welding arc generating a weld puddle behind the welding arc;
  a power supply configured to provide electricity to the electrode to generate the welding arc;
  a radiation sensor comprising an aperture configured to focus the radiation sensor on the weld puddle, a radiation sensitive element, and an opto-electrical component having an electrical characteristic that changes in response to an amount of radiation detected by the radiation sensitive element, the radiation sensor being configured to generate an output signal based on the electrical characteristic of the opto-electrical component, wherein an amplitude of the output signal is inversely related to the amount of the radiation detected; and
  a controller comprising an analog electrical circuit or a processor implementing a digitally defined algorithm, the controller including:
    a sensor controller in electrical communication with the radiation sensor, the sensor controller configured to receive the output signal from the radiation sensor and generate an error signal based on the output signal and a set signal, the set signal being representative of a set penetration depth, and
    a torch controller in electrical communication with the power supply or a wire feeder, the torch controller configured to control a travel speed of the welding torch, a current or voltage of the electricity provided by the power supply, or a wire feed speed of the wire feeder based on the error signal to maintain a penetration depth of the weld or height of the weld puddle.

20. A welding system, comprising:
  an arc welding torch configured to generate a welding arc between an electrode of the arc welding torch and a workpiece to form a weld, the welding arc generating a weld puddle behind the welding arc;
  a power supply configured to provide electricity to the electrode to generate the welding arc;
  a radiation sensor comprising an aperture configured to focus the radiation sensor on the weld puddle, a radiation sensitive element, and an opto-electrical component having an electrical characteristic that changes in response to an amount of radiation detected by the radiation sensitive element, the radiation sensor being configured to generate an output signal based on the electrical characteristic of the opto-electrical component, wherein an amplitude of the output signal is inversely related to the amount of the radiation detected;
  processing circuitry; and
  memory circuitry comprising machine readable instructions which, when executed by the processing circuitry, cause the processing circuitry to:
    perform a comparison of the output signal from the radiation sensor and a set signal representative of a set penetration depth,
    determine a difference between the output signal and the set signal based on the comparison, and
    control a travel speed of the welding torch, a current or voltage of the electricity provided by the power supply, or a wire feed speed based on the difference to maintain a penetration depth of the weld or height of the weld puddle.

* * * * *